United States Patent [19]

Rote et al.

[11] Patent Number: 5,603,964

[45] Date of Patent: Feb. 18, 1997

[54] APPARATUS FOR CUTTING AND DELIVERING PLASTIC GOBS

[75] Inventors: B. Jack Rote, Sturgis, Mich.; Frank W. Mahr, Jr., Sylvania, Ohio

[73] Assignee: Owens-Illinois Closure Inc., Toledo, Ohio

[21] Appl. No.: 320,083

[22] Filed: Oct. 7, 1994

[51] Int. Cl.$^6$ ............ B29C 31/00; B29C 43/34; B29D 31/00

[52] U.S. Cl. ............ 425/110; 264/148; 425/297; 425/313; 425/809

[58] Field of Search ............ 425/297, 311, 425/313, 809, 110; 264/148

[56] References Cited

U.S. PATENT DOCUMENTS

| | | | |
|---|---|---|---|
| 1,326,235 | 12/1919 | Wadsworth | 65/221 |
| 1,944,464 | 1/1934 | Richardson | 425/142 |
| 2,916,792 | 12/1959 | Crook et al. | 425/316 |
| 2,952,036 | 9/1960 | Gora | 425/297 |
| 3,160,493 | 12/1964 | Kuppers | 264/148 |
| 3,360,827 | 1/1968 | Aichele | 425/809 |
| 3,461,196 | 8/1969 | Bowles | 264/148 |
| 3,646,894 | 3/1972 | Hasten et al. | 425/315 |
| 3,674,393 | 7/1972 | Busi | 425/110 |
| 3,702,148 | 11/1972 | Busi | 141/67 |
| 3,782,329 | 1/1974 | Everett | 425/809 |
| 3,827,843 | 8/1974 | Blouch | 425/809 |
| 3,867,081 | 2/1975 | Everett | 425/809 |
| 3,877,497 | 4/1975 | Busi | 425/809 |
| 3,963,396 | 6/1976 | Shotbolt et al. | 425/297 |
| 4,060,053 | 11/1977 | Ohmi | 425/311 |
| 4,296,061 | 10/1981 | Buckingham | 425/308 |
| 4,518,336 | 5/1985 | Alieri | 425/809 |
| 4,640,673 | 2/1987 | Takeda et al. | 425/297 |
| 4,735,761 | 4/1988 | Lindenberger | 425/297 |
| 5,007,150 | 4/1991 | Alieri et al. | 425/809 |
| 5,031,749 | 7/1991 | McCoy | 264/238 |
| 5,074,102 | 12/1991 | Simpson et al. | 53/140 |
| 5,273,418 | 12/1993 | Kato et al. | 425/297 |

Primary Examiner—Robert Davis

[57] ABSTRACT

A method for severing gobs of melt extrudate, transporting and placing the gobs in molds for compression molding which includes providing an extrudate from an orifice, providing a plurality of C-shaped nests, continuously moving the C-shaped nests in a path past an orifice to sever a gob from the extrudate being extruded and transporting the gob along the path to a position for delivery to a plurality of tooling moved in succession past a delivery station, and applying a force to the gob axially of each nest to deliver a respective pellet to the tooling. An apparatus is provided for severing gobs from a melt extrudate, transporting the gobs, and delivery the gobs comprising a base and a disk having an axis of rotation supported on the base for rotation about the axis. A plurality of transfer nests are mounted on the disk in circumferentially spaced relation. Each transfer nest has a generally semi-cylindrical inner surface extending about a 180° and has an opening. Each cylindrical surface of the nest has an axis. An extrusion nozzle has an outlet nozzle for extruding hot melt extrudate into the path of each transfer nest such that the extrudate enters the cavity of the transfer nest and the movement of the transfer nest severs a plastic gob from the extrudate. The apparatus is operable to apply a force to the plastic gob at a point circumferentially spaced from the extrusion nozzle to discharge the gob.

71 Claims, 14 Drawing Sheets

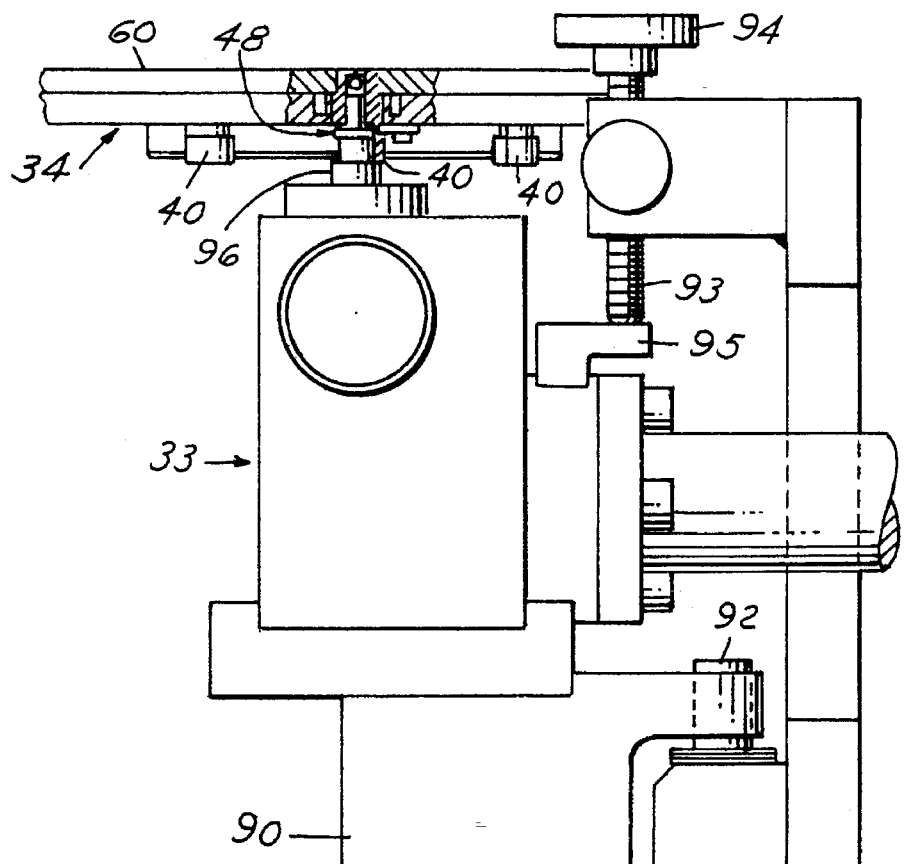
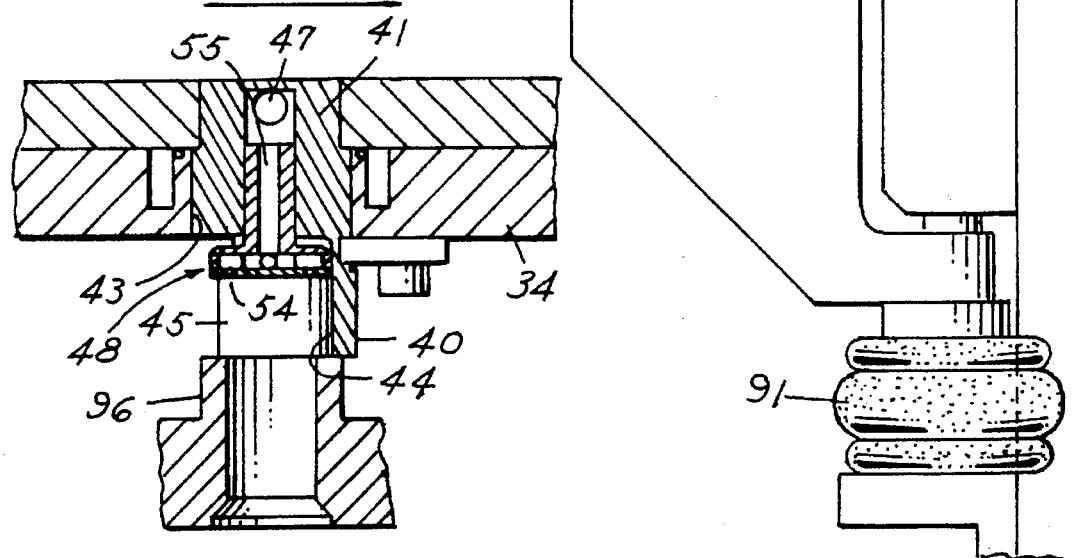
FIG.9
FIG.10

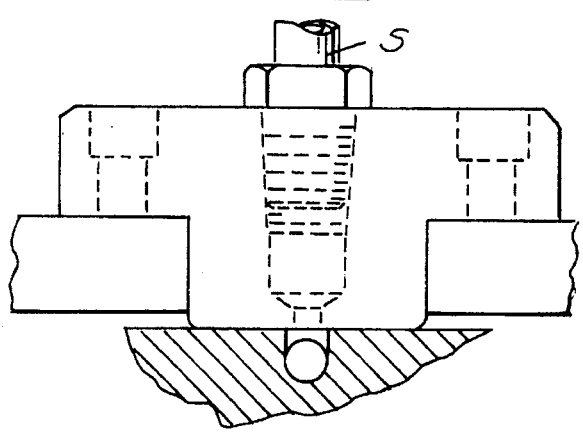
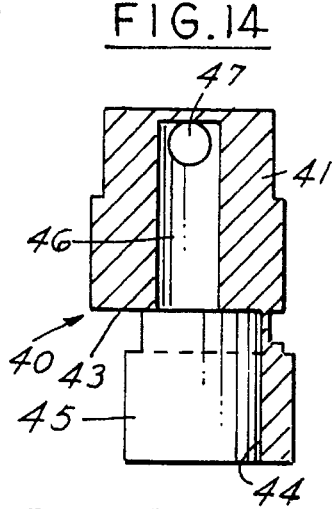
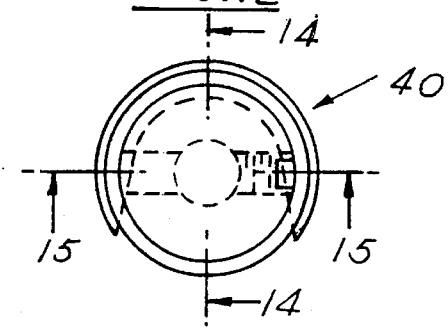
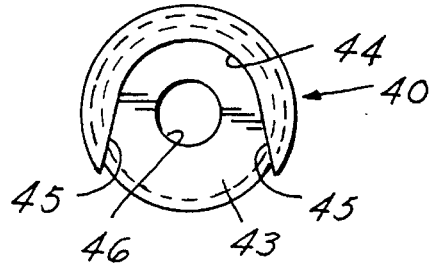
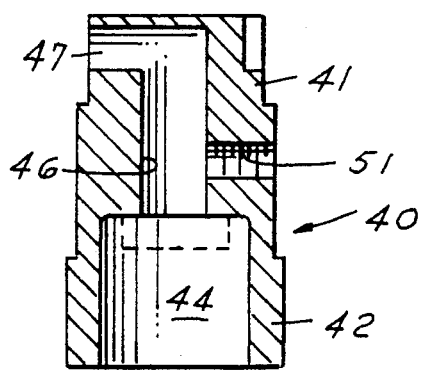
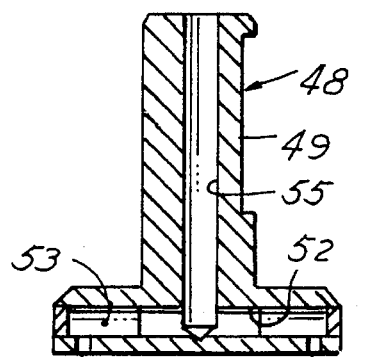
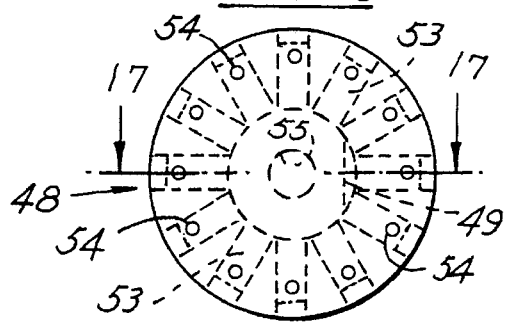

5,603,964

APPARATUS FOR CUTTING AND DELIVERING PLASTIC GOBS

This invention relates to cutting gobs from a stream of hot melt extrudate and delivering the gobs to a receptacle for further processing such as compression molding.

BACKGROUND AND SUMMARY OF THE INVENTION

In the use of plastic gobs separated from extruded stream of material, a plastic gob is severed from the extrudate and delivered directly to tooling.

Among the objectives of the present invention are to provide a method and apparatus for cutting gobs from a stream of a plastic extrudate outside of the plane in which separate tooling forms that gob into an end product such as a plastic article or a liner on a plastic article; wherein such method and apparatus provides a greater range in flexibility in the gob size and the thermal plastic materials used; wherein the gob is cut at a point remote from the forming tooling and thereby provides the ability to have greater capacity in gob size providing a greater range of plastic products which can be made; which method and apparatus permits the delivery and discharge of the gobs accurately at the forming point; wherein the apparatus can be positioned spatially for movement in horizontal or vertical planes or in planes to angles to the horizontal or vertical; wherein the method and apparatus utilizes a plurality of contoured gob cutters on a rotating disk that can be at any angle in space ranging from horizontal to vertical.

In accordance with the invention, a plurality of contoured gob cutters or nests are provided that are moved at an endless path past the plastic material being extruded from an extruder nozzle, thereby cutting a portion of the extrudate stream to form gobs. The nests are then moved to a position where the gobs are successively delivered by application of a force such as pneumatic pressure through the nests into the forming tools. The nests are supported on a rotating disk. Each nest is maintained at a temperature sufficient to retain the gob but not so great that the gobs sticks to the nest. In one form the temperature is controlled by a liquid coolant flowing through the disk. A control system is provided for electronically controlling the various components of the system.

DESCRIPTION OF THE DRAWINGS

FIG. 9 is a fragmentary part sectional elevational view on an enlarged scale of a portion of the apparatus shown in FIG. 1.

FIG. 10 is a sectional view on an enlarged scale taken along the line 10—10 in FIG. 7.

FIG. 11 is a part sectional elevational view on an enlarged scale of a portion of the apparatus shown in FIG. 7.

FIG. 12 is a top plan view of a nest utilized in the apparatus.

FIG. 13 is a bottom plan view of the nest.

FIG. 14 is a sectional view taken along the line 14—14 in FIG. 12.

FIG. 15 is a sectional view taken along the line 15—15 in FIG. 12.

FIG. 16 is a bottom plan view of a blow-off nozzle utilized in association with the transfer nest.

FIG. 17 is a sectional view taken along the line 17—17 in FIG. 16.

DESCRIPTION OF THE PREFERRED EMBODIMENT

Figure 3:
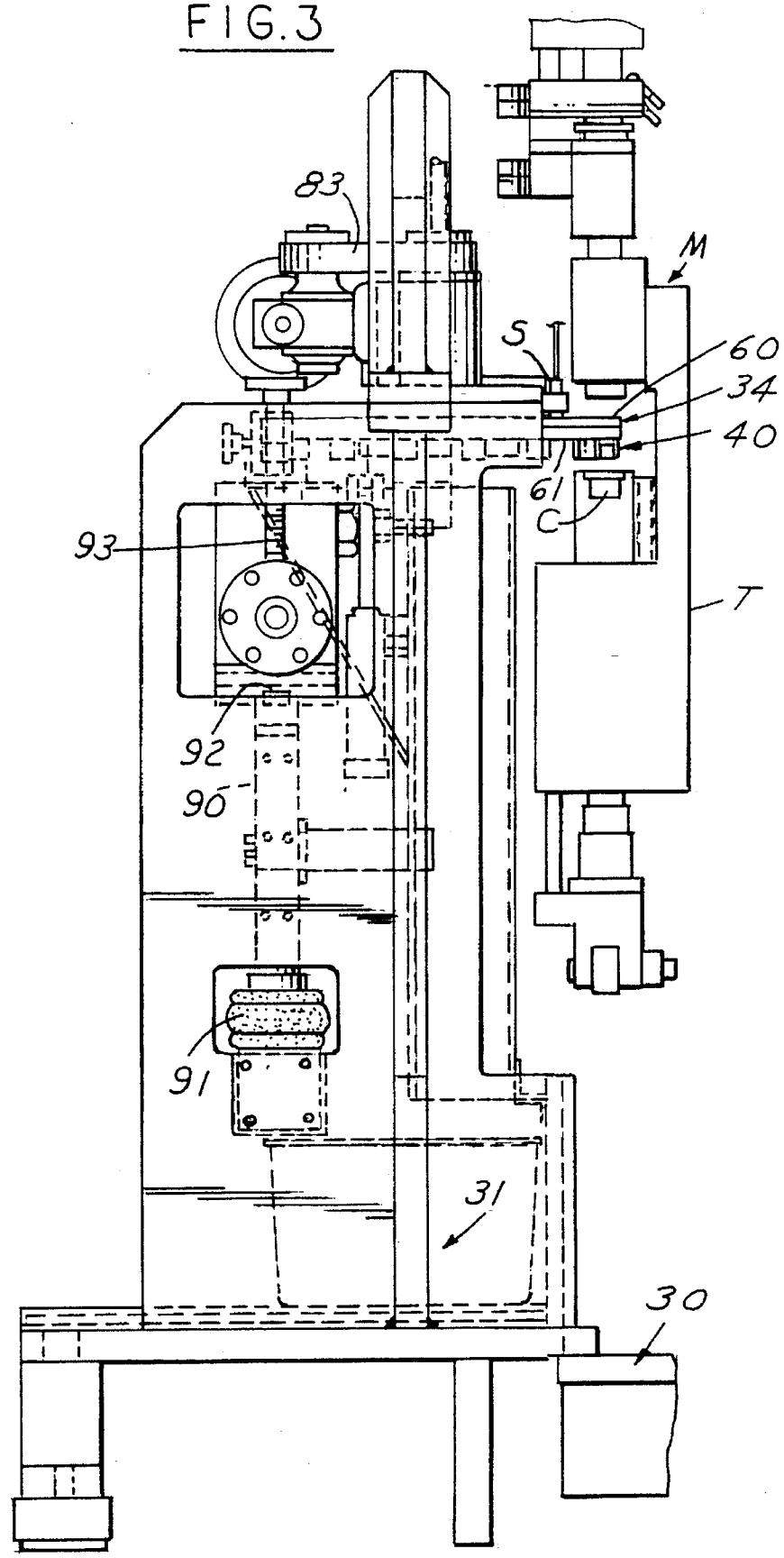
FIG. 3 is a side elevational view of the apparatus taken from the right from FIG. 1.

Referring to FIGS. 1–5, an apparatus embodying the invention is adapted to be provided adjacent a plastic molding machine for delivery of molten plastic gobs or pellets of predetermined size to the tooling of a compression molding machine M. The apparatus comprises a base 30, a column 31 and a horizontal support 32 on the upper end column 31. An extruder nozzle assembly 33 is supported on the column 31 and supplies an extrudate upwardly. A cutter and transfer nest disk 34 is supported on a plate 35 for rotation about a vertical axis. The disk 34 carries a plurality of circumferentially spaced cutters and transfer nests 40 on the periphery thereof. The apparatus is mounted adjacent the path of tooling T of a compression molding machine M (FIGS. 2, 5) where the path of the nests overlaps the path of the tooling such that the apparatus delivers the plastic gobs to the tooling T of the plastic molding machine M. The tooling T may be of the type having a cavity C into which the plastic gob is delivered (FIG. 3).

Figure 4:
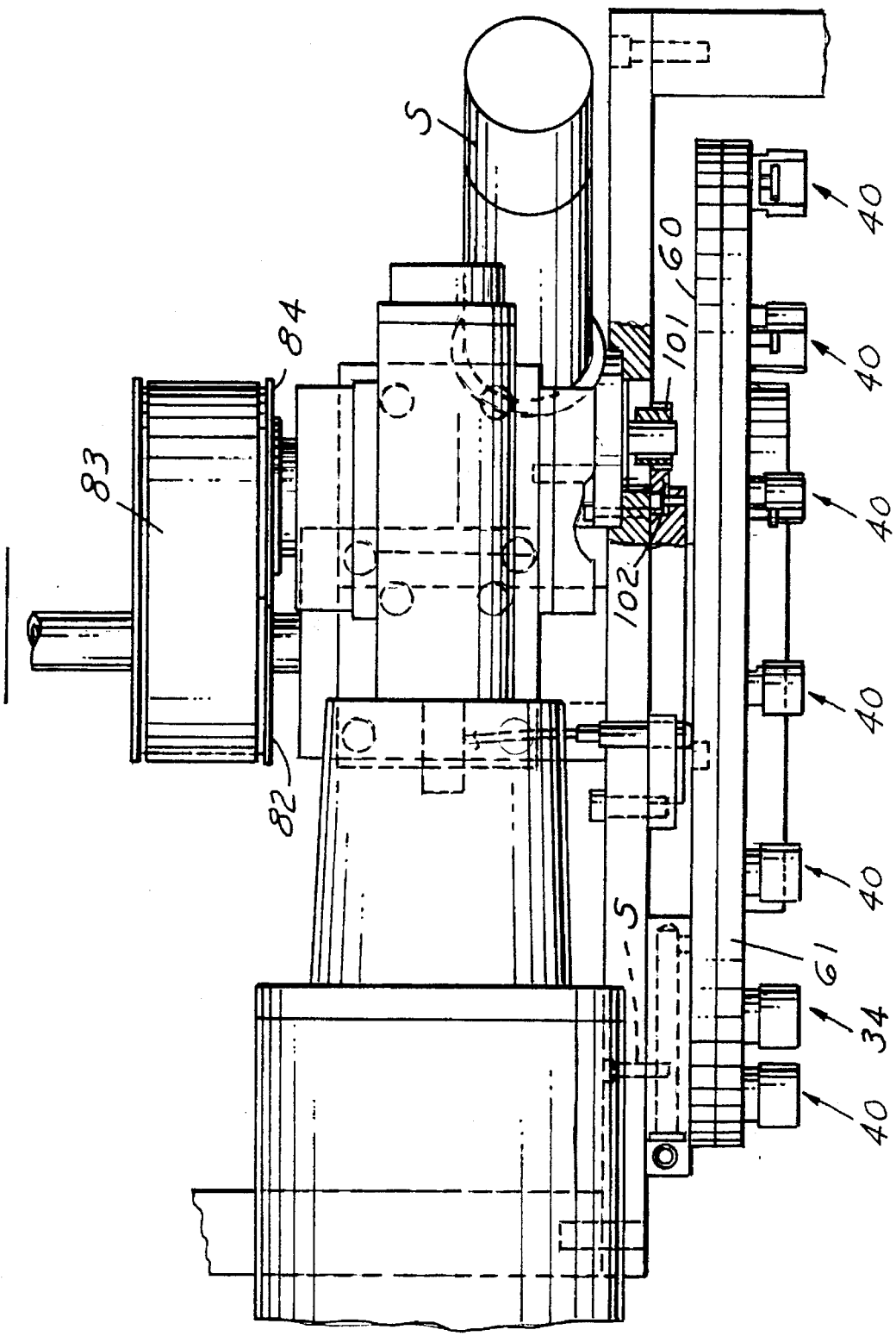
FIG. 4 is a fragmentary view of an enlarged portion of the upper end of the apparatus shown in FIG. 1.
Figure 5:
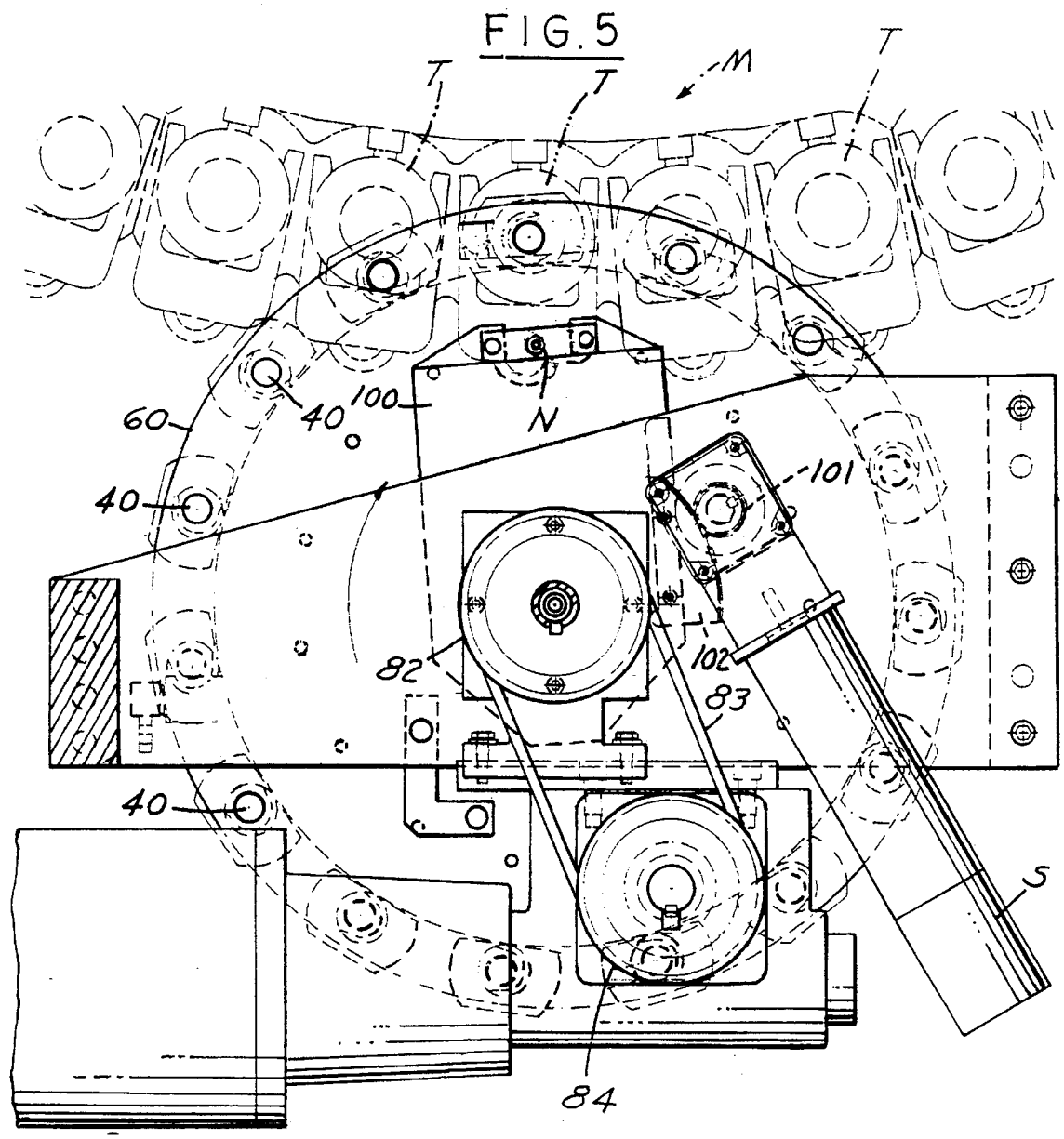
FIG. 5 is a fragmentary top plan view of the apparatus as shown in FIG. 2 parts being broken away.

Referring to FIGS. 10, 12–17, each transfer nest 40 includes an upper portion 41 and a lower portion 42. The upper portion 41 is adapted to extend into an opening 43 in the disk 34 and be held in position therein by a set screw. The lower portion 42 of each transfer nest 40 is generally cylindrical and has an inner surface 44 that is semi-cylindrical and has its axial edges flaring outwardly as at 45 to an opening 43 in the sidewall of the nest (FIG. 13). Each semi-cylindrical surface 45 has an axis parallel to the axis of rotation of the disk 34. An axial opening 46 extends from the interior of the lower portion 42 upwardly but not through the top wall to a lateral passage 47 to which gaseous fluid such as air under pressure is provided for discharging the plastic gob, as presently described. A blow-off nozzle 48 is provided in association with each transfer nest 40 and includes an upper portion 49 that extends into the opening 46. Nozzle 48 is held in position by a set screw 50 (FIG. 7) threaded into and extending through a threaded opening 51 in the upper portion 41 of the nest 40 to hold the blow-off nozzle 48 in axial position in the transfer nest 40. The blow-off nozzle 48 has a lower portion 52 of greater diameter than the upper portion 49. The lower portion 52 has a diameter equal to the diameter of the semi-cylindrical surface 45 of the lower portion 42. The lower portion 52 is hollow and defines a fluid chamber or plenum 53 having circumferentially spaced axial openings 54 and communicating with an axial passage 55 through the upper portion 49 so that fluid can be distributed to the opening 54 to provide a force for discharging the plastic gob. The blow-off nozzle 48 provides a second function of establishing volumetric size of the cavity defined by the transfer nest. By moving the blow-off nozzle 48 vertically the size of the cavity can be adjusted. Each transfer nest 40 is positioned circumferentially so that the open side 43 moves past the nozzle of the extruder assembly 33 to sever a gob from the upwardly directed plastic extrudate as shown in FIGS. 4 and 10.

The temperature of the surface 45 of each nest 40 is controlled such that there is a cohesion between the surfaces and the plastic gob to insure that the gob is retained until it is delivered to the tooling T. The cohesion is sufficient to retain the gob but not so great that the gob sticks and can not be delivered by the fluid such as air. In a preferred form, the surface 45 of each transfer nest 40 and the surface of the blow off nozzle 48 exposed to the plastic extrudate are treated. A preferred material is polytetrafluoroethylene sold by DuPont under the trademark "TEFLON".

Figure 7:
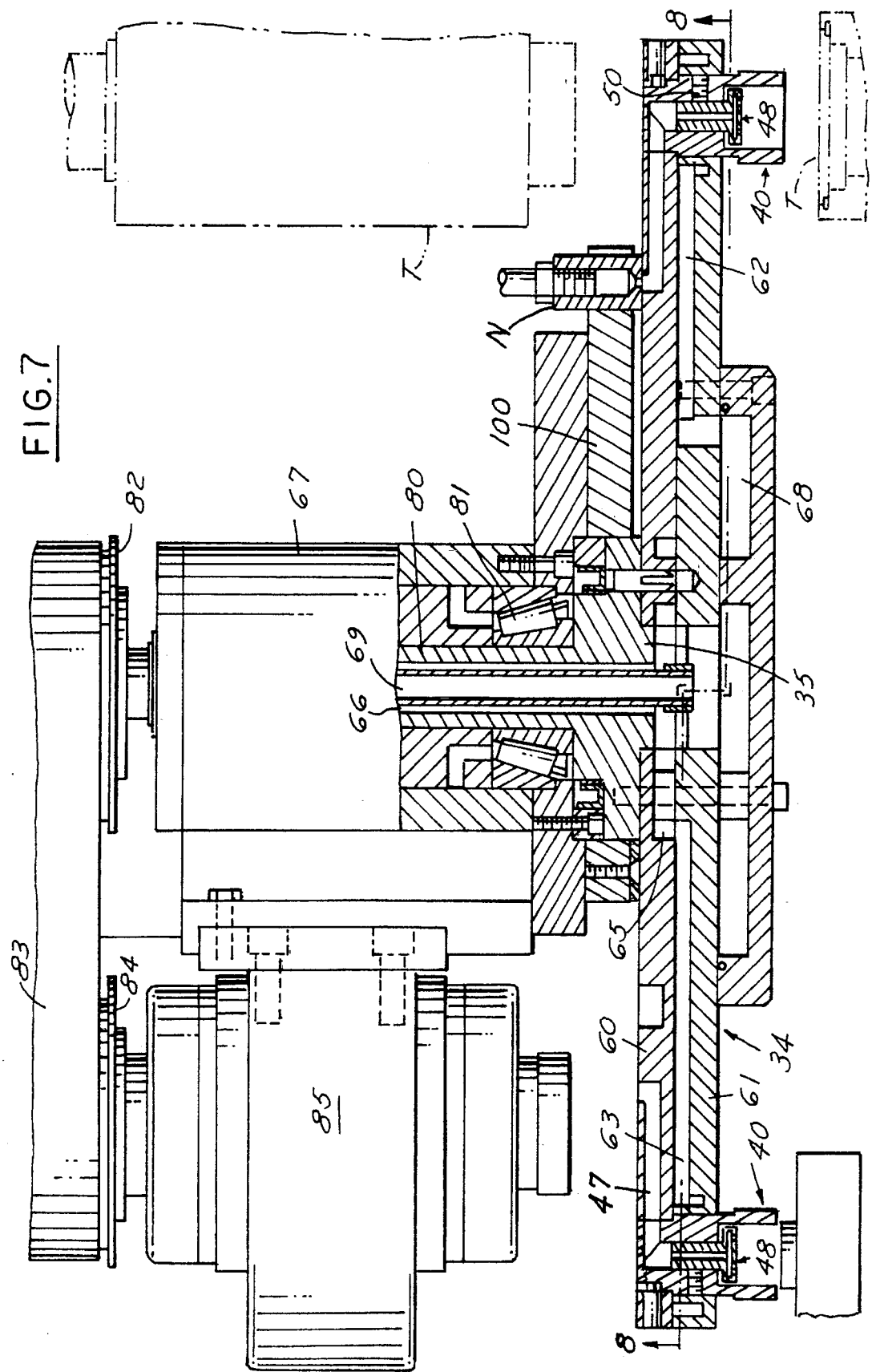
FIG. 7 is a sectional view taken along the line 7—7 in FIG. 8.
Figure 8:
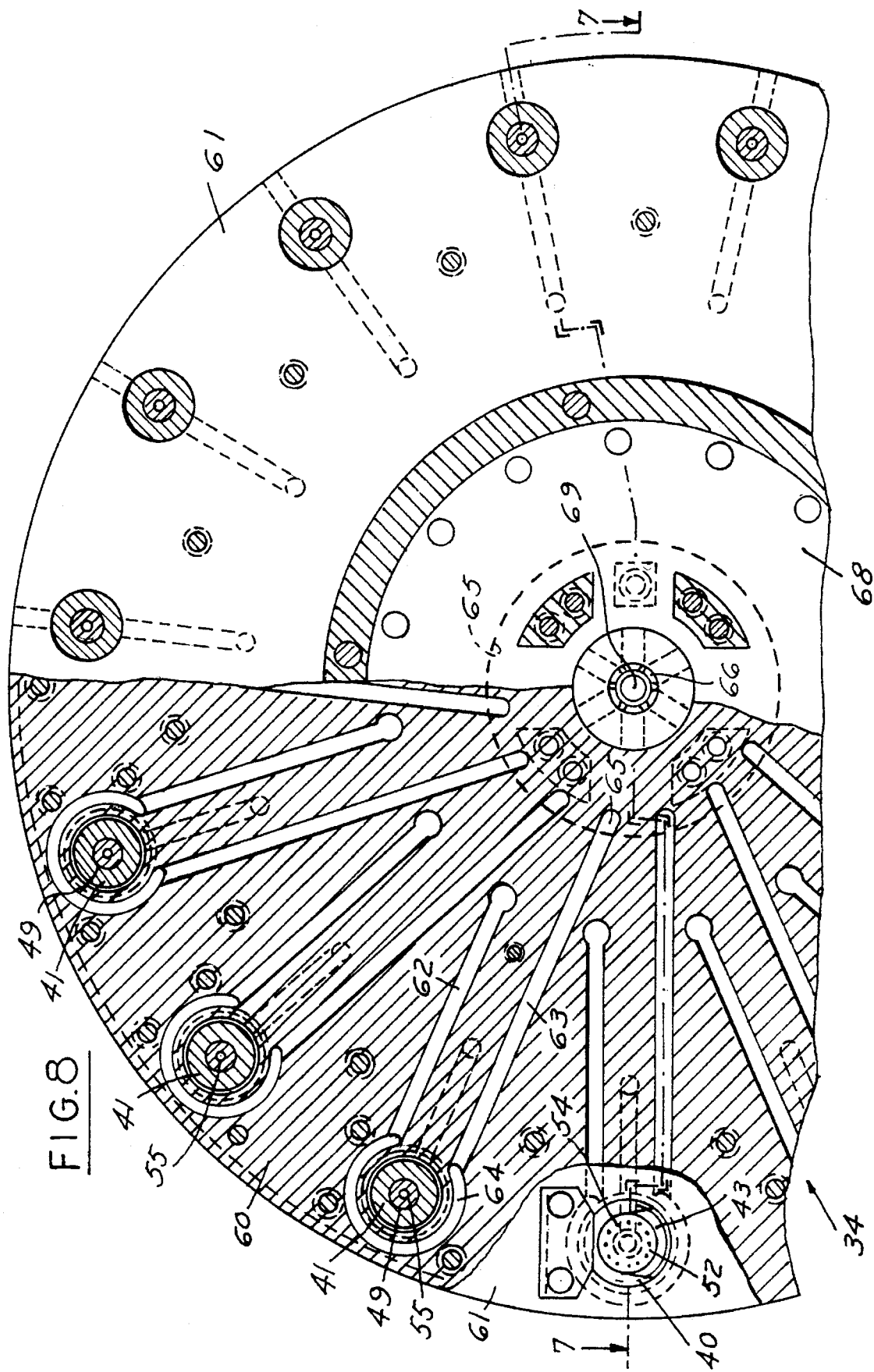
FIG. 8 is a sectional view taken along the line 8—8 in FIG. 7.

In addition, in order to control the adhesion, the temperature of the nests 40 and nozzles 48 is controlled by cooling sufficiently such that the plastic gob is cohered but not such that the gob adheres. Referring to FIGS. 7 and 8, the transfer disk 34 consists of an upper plate 60 and a lower plate 61, the lower plate 61 includes a plurality of sets of radial grooves 62, 63 that communicate with an annular groove 64 about each nest 40. The inner ends of the grooves 62, 63 communicate with a plenum 65 to which coolant is supplied through an axial passage 66 in a column 67 and from which coolant is removed through a plenum 68 and an axial passage 69. The disk 34 is fixed to a shaft 80 rotatably mounted in column 67 by bearings 81. The upper end of the shaft extends outwardly and is driven by a pulley 82 connected by a belt 83 to a pulley 84 of a servo motor 85 (FIG. 6, 7).

Figure 1:
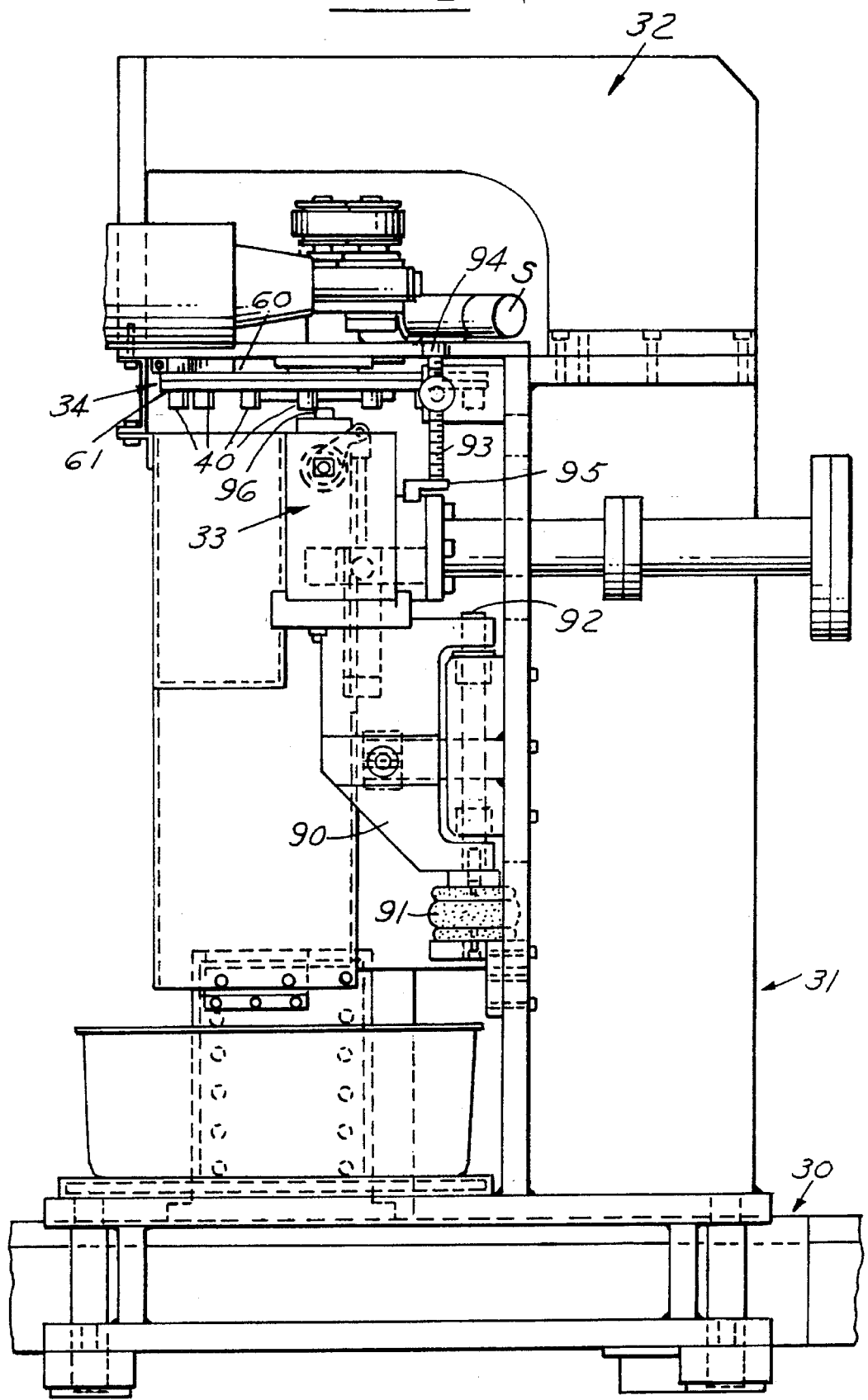
FIG. 1 is an elevational view of an apparatus embodying the invention.
Figure 2:
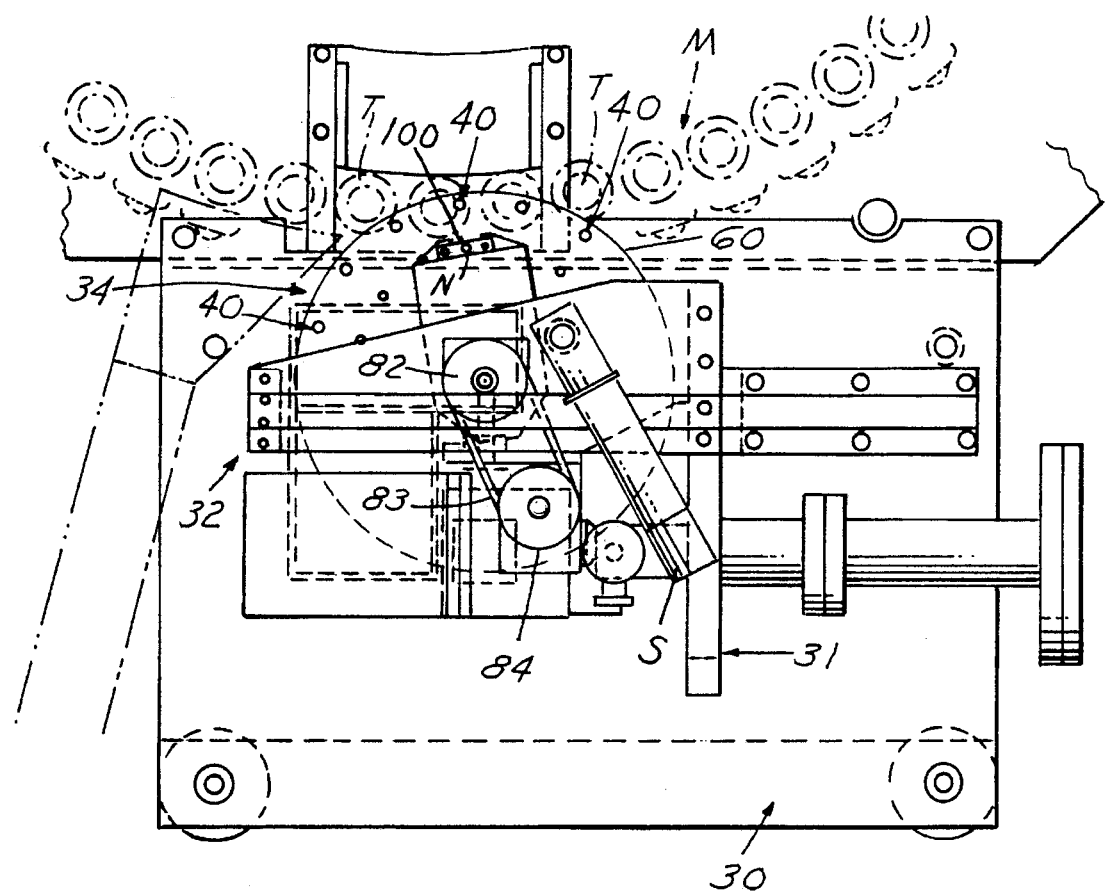
FIG. 2 is a plan view of the apparatus.

Referring to FIGS. 1 and 9, the extrusion nozzle assembly 33 is supported on the column 31 such that its position a can be readily adjusted vertically. The nozzle assembly 33 is supported on a bracket 90 which in turn is movable axially upwardly and downwardly by an inflated fluid spring 91 acting on a shaft 92 that supports the bracket 90 and thereby yieldingly urging the bracket and in turn the nozzle assembly 33 upwardly against an adjustable stop 93. The stop 93 comprises a threaded shaft and knob 94 on the upper end thereof for rotating the knob and in turn the shaft 93 so that the position of the stop 93 can be varied. A stop member 95 engages the lower end of the threaded stop 93. As seen in FIG. 9 the nozzle assembly 93 includes a nozzle 96 that extends upwardly adjacent the path of each transfer nest 40. Preferably the nozzle 96 is spaced slightly such that it does not engage the transfer nest 40 and movement of the transfer nests past the nozzle sever the plastic gobs without touching the nozzle 96.

Preferably each transfer nest 40 is made of metal and includes a coating on the surfaces 44, 45. It has been found that the rotation of the disk and the interaction of the plastic gob with the surface is sufficient to carry the gob without its being dropped until it is at the appropriate point for delivery to the tooling by application of fluid pressure.

Figure 6:
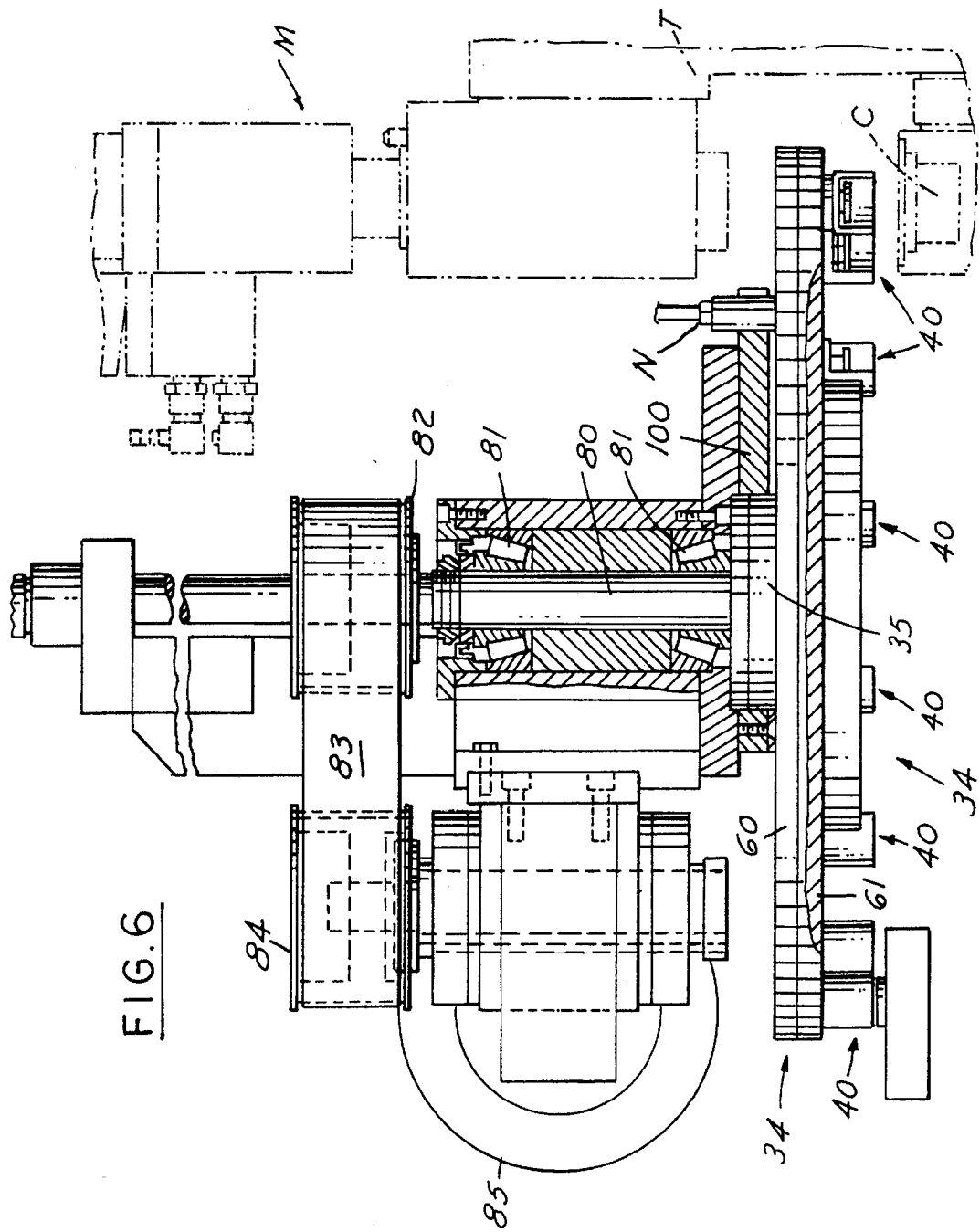
FIG. 6 is a sectional view taken along the line 6—6 in FIG. 5.

The application of the force such as by fluid pressure is controlled during the rotation by bringing the passage into communication with a source of fluid pressure at an inlet S (FIGS. 3–6). The position at which the fluid pressure is brought into communication can be adjusted by moving the plate 100 which is rotatably mounted on shaft 80 and supports nozzle N (FIGS. 6 and 7). A pinion gear 101 engages an arcuate rack 102 on plate 100 and is driven by a servomotor S to change the position of the nozzle relative to the plate 100.

Figure 18:
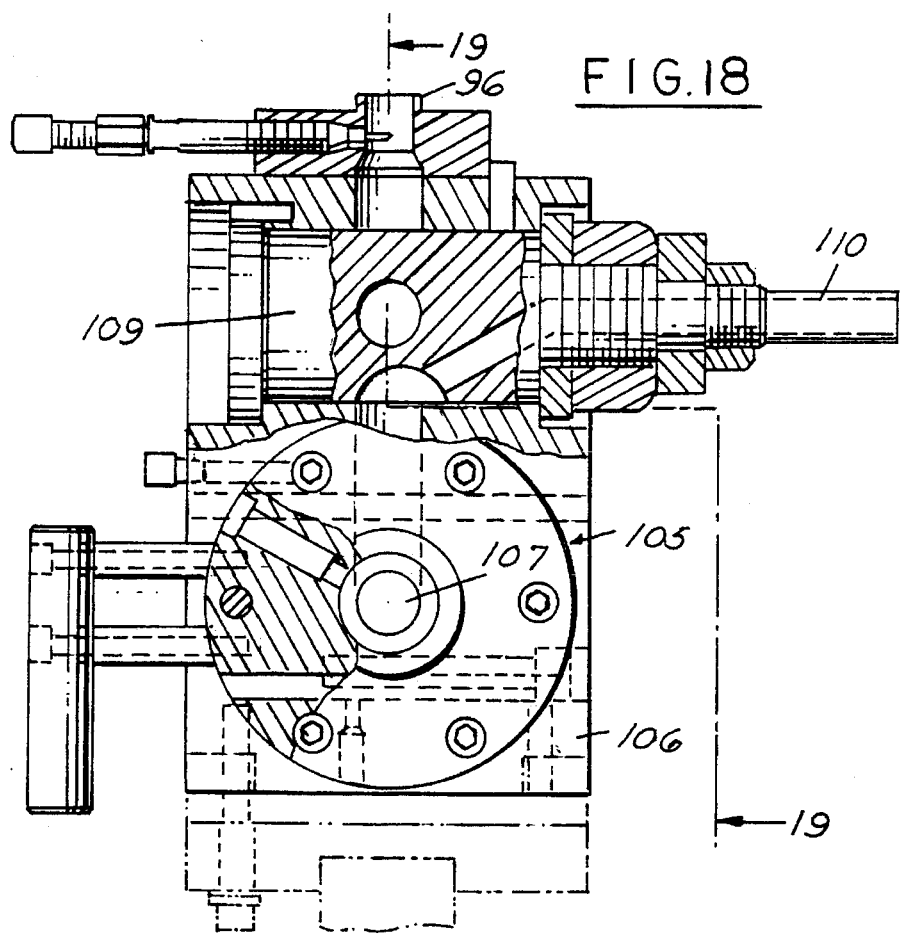
FIG. 18 is a sectional view through the extrudate nozzle assembly.
Figure 19:
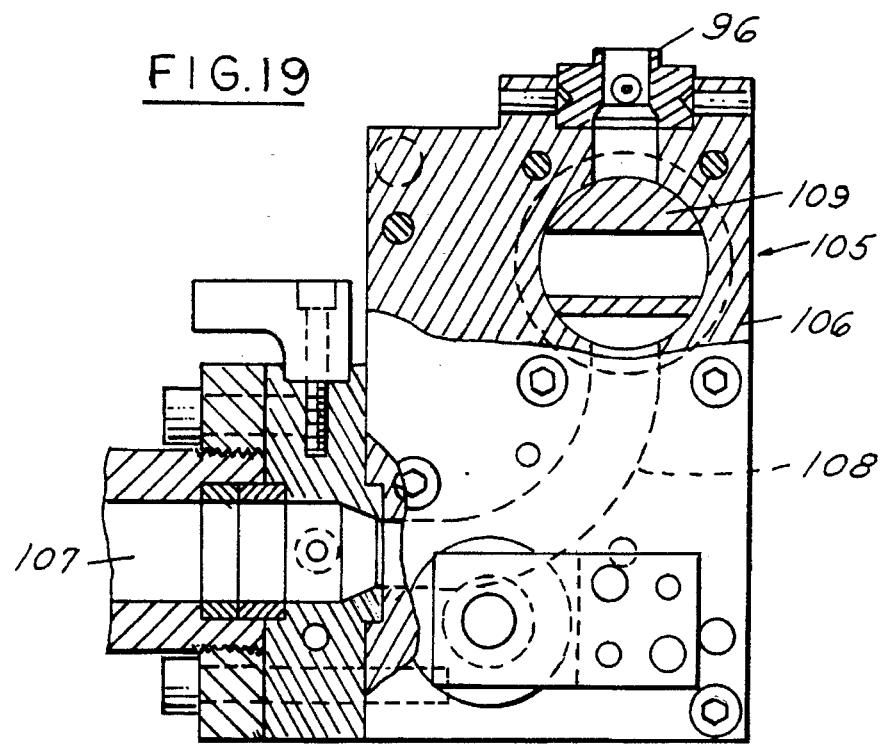
FIG. 19 is a sectional view taken along the line 19—19 in FIG. 18.

Referring to FIGS. 18 and 19, the apparatus preferably includes a valve assembly 105 which supports the nozzle 96. The valve assembly 105 includes a body 106 having an inlet 107 communicating with the extruder and a passage 108 extending to a rotary valve 109. In one position, the rotary valve 109 bypasses plastic to a bypass passage 110 during start-up. In another position, the rotary valve 109 permits the plastic to flow to the nozzle 96.

Figure 20:
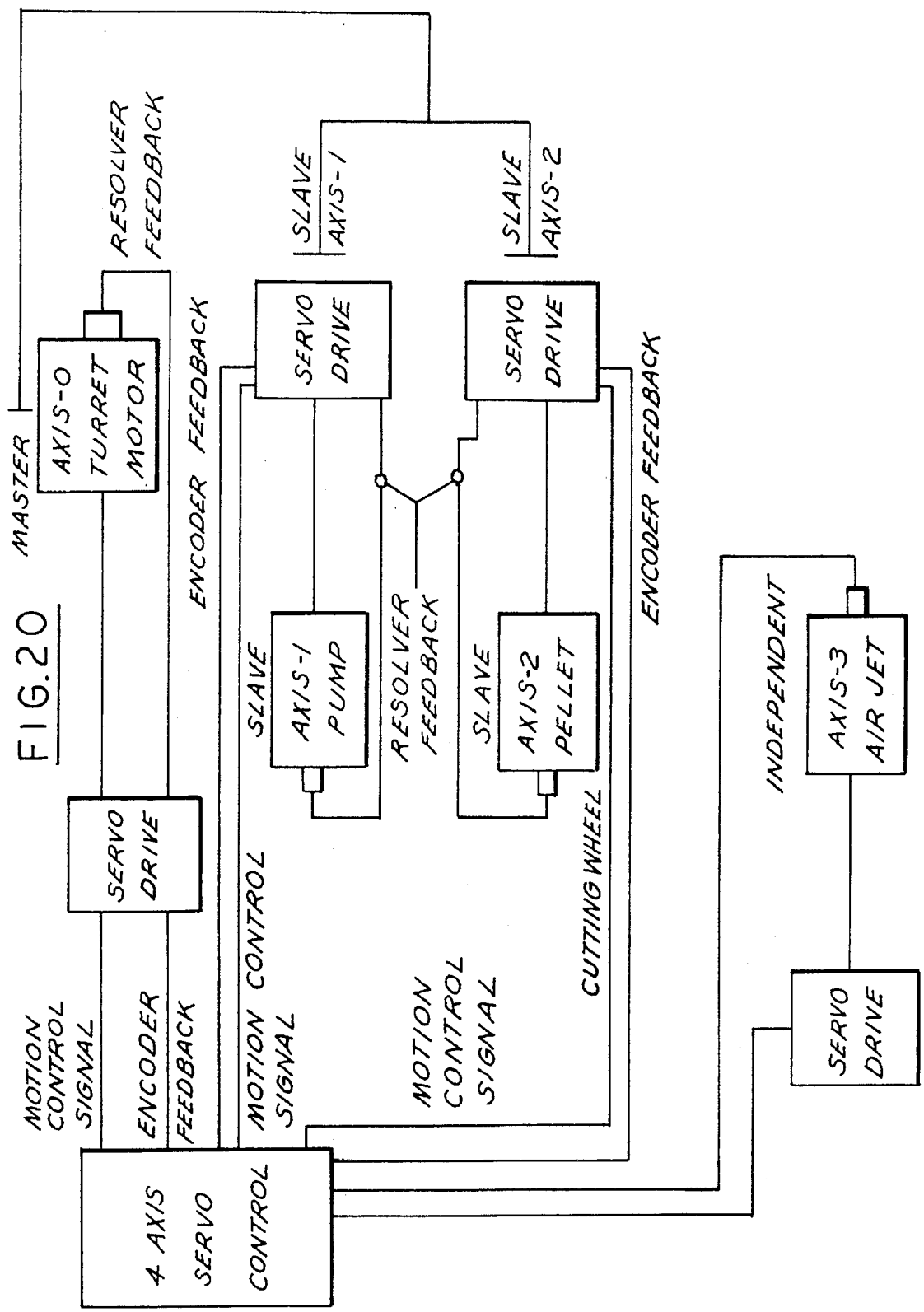
FIG. 20 is a schematic of the electronic motion control system.

Referring to FIG. 20, a motion control system provides electronic gearing functionality for independent axis motion.

The motion control system consist of four axis motion controller, such as an Allen-Bradley IMC/S class, communicating with four independent servo drives and four A.C. servo motors. Each independent axis has a resolver mounted to the servo motor for feedback to its associated drive. Feedback from each independent drive to the motion controller is established from a quad b boards translating the resolver based signals into an encoder signal.

The four axes are:
Axis 0—rotary turret
Axis 1—rotary melt pump
Axis 2—rotary pellet cutting wheel
Axis 3—air jet blow-off position
Axis 0—rotary turret Axis 0 acts is the master axis to slave axis 1 and 2. Speed of this axis is set by operator input statically or dynamically.

Axis 1—rotary melt pump

Axis 1 is a slave of the turret axis. Using the electronic gearing function of the motion controller the pump is set to track the turret axis by an operator selectable ratio of turret speed to pump speed.

Axis 2—rotary pellet cutting wheel

Axis 2 is also a slave of the turret axis. Using the electronic gearing function, the pellet cutting wheel is brought into a predetermined phase relationship with the turret axis by a homing routine executed during a normal start of the turret axis. The phase relationship between the wheel and turret axis may than be incremented or decremented a variable amount of degrees via operator input statically or dynamically.

Axis 3—air jet—blow-off position

Axis 3 acts independent of any other axis. The only motions of this axis are incremental or decremental steps initiated by operator intervention for adjustments of the air jet position relative to the pellet cutting wheel. At all other times this axis is stationary.

Figure 21:
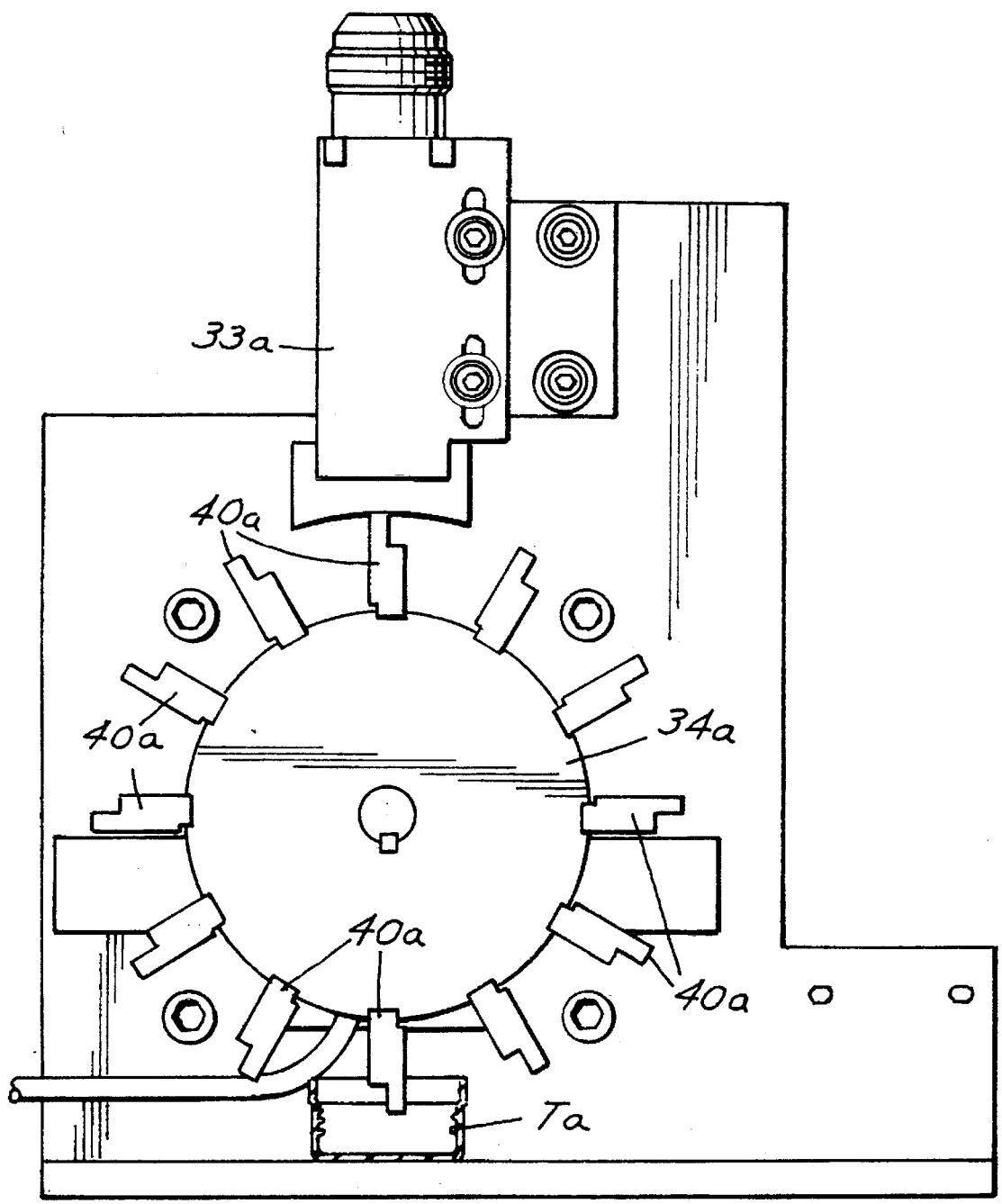
FIG. 21 is a schematic view of a modified form of apparatus.

In the modified form of apparatus shown in FIG. 21, the transfer nest disk 34a which supports nests 40a with the axis of each nest parallel to the plane of the disk 34a. Desk 34a is rotated about a horizontal axis and moves nests 40a from a position for receiving and cutting extrudate delivered by a nozzle assembly 33a to a lower position for delivering gobs to articles or molds of tooling Ta. In all other respects the apparatus including the nests 40a are of identical construction as described in connection with FIGS. 1–20.

Figure 22:
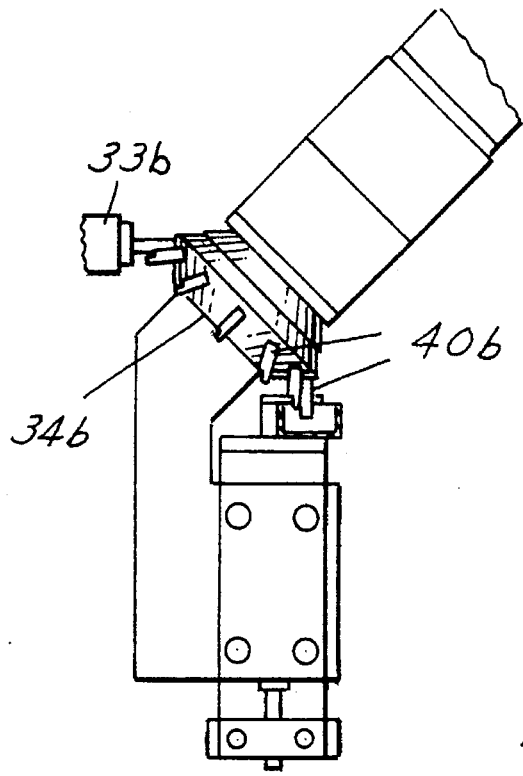
FIG. 22 is a schematic view of another modified form of apparatus.
Figure 24:
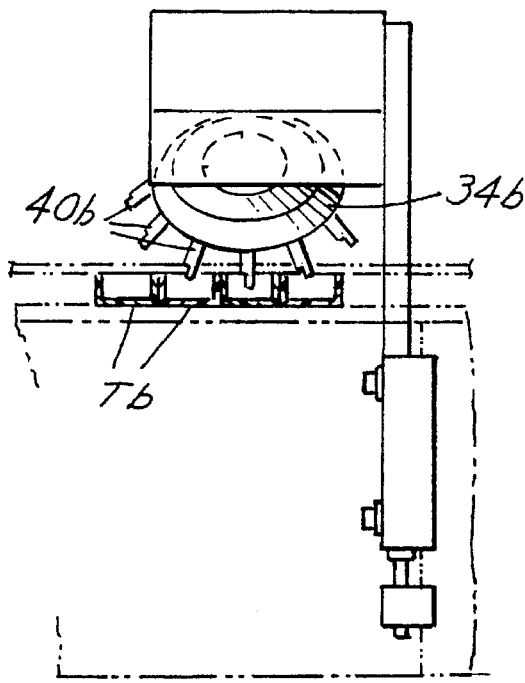
FIG. 24 is a side elevational view.
Figure 23:
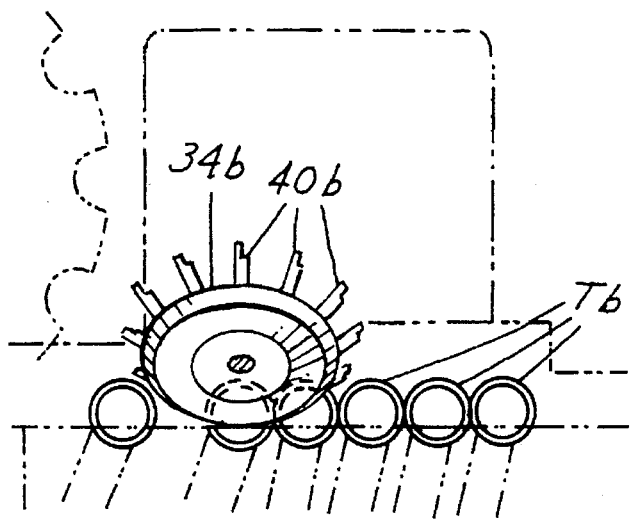
FIG. 23 is a front elevational view.

In the form shown in FIGS. 22–24, the transfer nest disk 34b is rotated about an axis at an acute angle, herein shown as 45° to the vertical with the axis of each nest 40b at an angle of 45° to the plane of disk 34b. As disk 34b is rotated, each nest 40b moves such that its axis is horizontal for cutting a gob from nozzle assembly 33b. The disk 34b then rotates to a position utilizing the tooling Tb with the axis of each nest 40b vertical for delivery of the gob to the tooling.

It can thus be seen that there has been provided a method and apparatus for cutting gobs from a stream of a plastic extrudate outside of the plane in which separate tooling forms that gob into an end product such as a plastic article or a liner on a plastic article; wherein such method and apparatus provides a greater range in flexibility in the gob size and the thermal plastic materials used; wherein the gob is cut at a point remote from the forming tooling and thereby provides the ability to have greater capacity in gob size providing a greater range of plastic products which can be made; which method and apparatus permits the delivery and discharge of the gobs accurately at the forming point; wherein the apparatus can be positioned spatially for movement in horizontal or vertical planes or in planes to angles to the horizontal or vertical; wherein the method and apparatus utilizes a plurality of contoured gob cutters on a rotating disk that can be at any angle in space ranging from horizontal to vertical.

What is claimed is:

1. An apparatus for severing gobs from a melt extrudate, transporting the gobs, and delivering the gobs comprising a base, a disk having an axis of rotation, means for supporting said disk on said base for rotation about said axis, a plurality of transfer nests mounted on said disk in circumferentially spaced relation, each transfer nest having a generally semi-cylindrical inner surface extending about 180° and having an opening, each cylindrical surface of said nest having an axis, extrusion nozzle means having an outlet nozzle for extruding hot melt extrudate into the path of each transfer nest such that the extrudate enters a cavity of the transfer nest and the movement of the transfer nest severs a plastic gob from the extrudate, means on the base operable to apply a force to the plastic gob at a point circumferentially spaced from the extrusion nozzle means to discharge the gob, said means for applying a force for discharging said plastic gob comprising means for applying fluid pressure to the gob to cause it to move through the open end of the transfer nest, means for supporting said extrusion nozzle means for movement toward and away from said disk.

2. The apparatus set forth in claim 1 wherein said means for supporting said extrusion nozzle means comprises an inflated spring and stop means engaged by said extrusion nozzle means to limit said movement of said extrusion nozzle means toward said disk.

3. The apparatus set forth in claim 2 including means for adjusting the position of said stop means.

4. The apparatus set forth in claim 1 wherein said semi-cylindrical surface portion has edges flaring outwardly.

5. The apparatus set forth in claim 1 wherein said disk comprises spaced plates, one of said plates having radial grooves communicating with an annular groove about each transfer nest, a first plenum communicating with said grooves such that coolant can be provided adjacent the nests and a second plenum and an axial passage communicating with said annular groove for removing coolant.

6. The apparatus set forth in claim 5 wherein each said nest includes an upper portion and a lower portion, said upper portion extending into an opening in said transfer disk, said lower portion comprising said semi-cylindrical surface portion.

7. The apparatus set forth in claim 6 wherein said semi-cylindrical surface portion has edges flaring outwardly.

8. The apparatus set forth in claim 7 including a blow off nozzle positioned within each said transfer nest.

9. The apparatus set forth in claim 8 wherein each said blow off nozzle includes an upper portion and means for adjusting the position of each said nozzle axially of said cylindrical surface.

10. The apparatus set forth in claim 9 wherein each said nozzle includes a lower portion of greater diameter than the upper portion.

11. The apparatus set forth in claim 10 wherein the diameter of said lower portion of each said blow off nozzle has a diameter of the semi-cylindrical surface of the lower portion of the transfer nest.

12. The apparatus set forth in claim 11 wherein said lower portion of the blow off nozzle is hollow defining a plenum and axial openings extending from said plenum in said lower portion of said nozzle to the interior of said transfer nest and an axial opening in said upper portion of said blow off nozzle communicating with said plenum in the lower portion such that fluid can be supplied through the axial opening in the upper portion to the plenum in the lower portion.

13. The apparatus set forth in claim 12 including means for supplying fluid to each said blow-off nozzle as it moves past a discharge station.

14. The apparatus set forth in claim 13 including means for moving said supply means circumferentially relative to said disk to adjust the position of application of fluid to each said blow-off nozzle.

15. The apparatus set forth in any one of claims 1, 2–4 and 5–14 wherein the axis of rotation of said disk is vertical, the extrusion nozzle means is positioned to extrude extrudate upwardly and the axis of each nest is vertical.

16. The apparatus set forth in any one of claims 1, 2–4 and 5–14 wherein the axis of rotation of said disk is horizontal, the extrusion nozzle means is positioned to extrude extrudate downwardly and the axis of each nest is parallel to the plane of the disk.

17. The apparatus set forth in any one of claims 1, 2–4 and 5–14 wherein the axis of rotation of the disk is at 45° degrees to the vertical, the extruder nozzle means is positioned to extrude extrudate horizontally and the axis of each nest is at an angle of 45° to the plane of the disk.

18. An apparatus for severing gobs from a melt extrudate, transporting the gobs, and delivering the gobs comprising a base, a disk having an axis of rotation, means for supporting said disk on said base for rotation about said axis, a plurality of transfer nests mounted on said disk in circumferentially spaced relation, each transfer nest having a generally semi-cylindrical inner surface extending about 180° and having an opening, each cylindrical surface of said nest having an axis, extrusion nozzle means having an outlet nozzle for extruding hot melt extrudate into the path of each transfer nest such that the extrudate enters a cavity of the transfer nest and the movement of the transfer nest severs a plastic gob from the extrudate, means on the base operable to apply a force to the plastic gob at a point circumferentially spaced from the extrusion nozzle means to discharge the gob, means for conditioning the temperature of each nest to retain the gob without sticking.

19. The apparatus set forth in claim 18 wherein said disk comprises spaced plates, one of said plates having radial grooves communicating with an annular groove about each transfer nest, a first plenum communicating with said grooves such that coolant can be provided adjacent the nests and a second plenum and an axial passage communicating with said annular groove for removing coolant.

20. The apparatus set forth in claim 19 wherein each said nest includes an upper portion and a lower portion, said upper portion extending into an opening in said transfer disk, said lower portion comprising said semi-cylindrical surface portion.

21. The apparatus set forth in claim 20 wherein said semi-cylindrical surface portion has edges flaring outwardly.

22. The apparatus set forth in claim 21 including a blow off nozzle positioned within each said transfer nest.

23. The apparatus set forth in claim 22 wherein each said blow off nozzle includes an upper portion and means for adjusting the position of each said nozzle axially of said cylindrical surface.

24. The apparatus set forth in claim 23 wherein each said nozzle includes a lower portion of greater diameter than the upper portion.

25. The apparatus set forth in claim 24 wherein the diameter of said lower portion of each said blow off nozzle has a diameter of the semi-cylindrical surface of the lower portion of the transfer nest.

26. The apparatus set forth in claim 25 wherein said lower portion of the blow off nozzle is hollow defining a plenum and axial openings extending from said plenum in said lower portion of said nozzle to the interior of said transfer nest and an axial opening in said upper portion of said blow off nozzle communicating with said plenum in the lower portion such that fluid can be supplied through the axial opening in the upper portion to the plenum in the lower portion.

27. The apparatus set forth in claim 26 including means for supplying fluid to each said blow-off nozzle as it moves past a discharge station.

28. The apparatus set forth in claim 27 including means for moving said supply means circumferentially relative to said disk to adjust the position of application of fluid to each said blow-off nozzle.

29. The apparatus set forth in any one of claims 18–28 wherein the axis of rotation of said disk is vertical, the extrusion nozzle means is positioned to extrude extrudate upwardly and the axis of each nest is vertical.

30. The apparatus set forth in any one of claims 18–28 wherein the axis of rotation of said disk is horizontal, the extrusion nozzle means is positioned to extrude extrudate downwardly and the axis of each nest is parallel to the plane of the disk.

31. The apparatus set forth in any one of claims 18–28 wherein the axis of rotation of the disk is at 45° degrees to the vertical, the extruder nozzle means is positioned to extrude extrudate horizontally and the axis of each nest is at an angle of 45° to the plane of the disk.

32. An apparatus for severing gobs from a melt extrudate, transporting the gobs, and delivering the gobs successively to cavities of a compression molding machine which includes tooling including cavities, said tooling and cavities being movable in an arcuate path about a first vertical axis comprising a base, a disk having a second axis of rotation, means for supporting said disk on said base for rotation about said second axis spaced from said first axis, a plurality of transfer nests mounted on said disk in circumferentially spaced relation, each transfer nest having a generally semi-cylindrical inner surface extending about 180° and having an opening, each said transfer nest having means closing one end of said opening, each cylindrical surface of said nest having an axis, extrusion nozzle means having an outlet nozzle for extruding hot melt extrudate through the other end of said cavity into the path of each transfer nest such that the extrudate enters a cavity of the transfer nest and the movement of the transfer nest severs a plastic gob from the extrudate, means on the base operable to apply a force to the plastic gob at a point circumferentially spaced from the extrusion nozzle means to discharge the gob into the upper end of a cavity.

33. The apparatus set forth in claim 32 wherein said means for applying a force for discharging said plastic gob comprises means for applying fluid pressure through said means closing the one end of said opening to the gob to cause it to move through the open end of the transfer nest.

34. The apparatus set forth in claim 33 including means for supporting said extrusion nozzle means for movement toward and away from said disk.

35. The apparatus set forth in claim 34 wherein said means for supporting said extrusion nozzle means comprises an inflated spring and stop means engaged by said extrusion nozzle means to limit said movement of said extrusion nozzle means toward said disk.

36. The apparatus set forth in claim 35 including means for adjusting the position of said stop means.

37. The apparatus set forth in claim 32 wherein said semi-cylindrical surface portion has edges flaring outwardly below said means closing said one end of said opening.

38. The apparatus set forth in claim 32 including means for conditioning the temperature of each nest to retain the gob without sticking.

39. The apparatus set forth in claim 38 wherein said disk comprises spaced plates, one of said plates having radial grooves communicating with an annular groove about each transfer nest, a first plenum communicating with said grooves such that coolant can be provided adjacent the nests and a second plenum and an axial passage communicating with said annular groove for removing coolant.

40. The apparatus set forth in claim 39 wherein each said nest includes an upper portion and a lower portion, said upper portion extending into an opening in said transfer disk, said lower portion comprising said semi-cylindrical surface portion.

41. The apparatus set forth in claim 40 wherein said semi-cylindrical surface portion has edges flaring outwardly.

42. The apparatus set forth in claim 41 including a blow off nozzle positioned within each said transfer nest.

43. The apparatus set forth in claim 42 wherein each said blow off nozzle includes an upper portion and means for adjusting the position of each said nozzle axially of said cylindrical surface.

44. The apparatus set forth in claim 43 wherein each said nozzle includes a lower portion of greater diameter than the upper portion.

45. The apparatus set forth in claim 44 wherein the diameter of said lower portion of each said blow off nozzle has a diameter of the semi-cylindrical surface of the lower portion of the transfer nest.

46. The apparatus set forth in claim 45 wherein said lower portion of the blow off nozzle is hollow defining a plenum and axial openings extending from said plenum in said lower portion of said nozzle to the interior of said transfer nest and an axial opening in said upper portion of said blow off nozzle communicating with said plenum in the lower portion such that fluid can be supplied through the axial opening in the upper portion to the plenum in the lower portion.

47. The apparatus set forth in claim 46 including means for supplying fluid to each said blow-off nozzle as it moves past a discharge station.

48. The apparatus set forth in claim 47 including means for moving said supply means circumferentially relative to said disk to adjust the position of application of fluid to each said blow-off nozzle.

49. The apparatus set forth in any one of claims 32–48 wherein the axis of rotation of said disk is vertical, the extrusion nozzle means is positioned to extrude extrudate upwardly and the axis of each nest is vertical.

50. The apparatus set forth in any one of claims 32–48 wherein the axis of rotation of said disk is horizontal, the extrusion nozzle means is positioned to extrude extrudate downwardly and the axis of each nest is parallel to the plane of the disk.

51. The apparatus set forth in any one of claims 32–48 wherein the axis of rotation of the disk is at 45° degrees to the vertical, the extruder nozzle means is positioned to extrude extrudate horizontally and the axis of each nest is at an angle of 45° to the plane of the disk.

52. An apparatus for severing gobs from a melt extrudate, transporting the gobs, delivering the gobs successively to cavities and compression molding the gobs in the cavities comprising a compression molding machine comprising a plurality of cavities and tooling including cavities for compression molding gobs delivered to said cavities, said cavities and tooling being movable in an arcuate path about a first vertical axis, a base separate from said compression molding machine, a disk having a second axis of rotation, means for supporting said disk on said base for rotation about said second axis spaced from said first axis, a plurality of transfer nests mounted on said disk in circumferentially spaced relation, the path of said nests overlapping the path of said cavities, each transfer nest having a generally semi-cylindrical inner surface extending about 180° and having an opening, each said transfer nest having means closing one end of said opening, each cylindrical surface of said nest having an axis, extrusion nozzle means having an outlet nozzle for extruding hot melt extrudate through the other end of said cavity into the path of each transfer nest such that the extrudate enters a cavity of the transfer nest and the movement of the transfer nest severs a plastic gob from the extrudate, means on the base operable to apply a force to the plastic gob at a point circumferentially spaced from the extrusion nozzle means to discharge the gob into a cavity of the compression molding machine.

53. The apparatus set forth in claim 52 wherein said means for applying a force for discharging said plastic gob comprises means for applying fluid pressure through said means closing the one end of said opening to the gob to cause it to move through the open end of the transfer nest.

54. The apparatus set forth in claim 53 including means for supporting said extrusion nozzle means for movement toward and away from said disk.

55. The apparatus set forth in claim 54 wherein said means for supporting said extrusion nozzle means comprises an inflated spring and stop means engaged by said extrusion nozzle means to limit said movement of said extrusion nozzle means toward said disk.

56. The apparatus set forth in claim 55 including means for adjusting the position of said stop means.

57. The apparatus set forth in claim 56 wherein said semi-cylindrical surface portion has edges flaring outwardly below said means closing said one end of said opening.

58. The apparatus set forth in claim 52 including means for conditioning the temperature of each nest to retain the gob without sticking.

59. The apparatus set forth in claim 58 wherein said disk comprises spaced plates, one of said plates having radial grooves communicating with an annular groove about each transfer nest, a first plenum communicating with said grooves such that coolant can be provided adjacent the nests and a second plenum and an axial passage communicating with said annular groove for removing coolant.

60. The apparatus set forth in claim 59 wherein each said nest includes an upper portion and a lower portion, said upper portion extending into an opening in said transfer disk, said lower portion comprising said semi-cylindrical surface portion.

61. The apparatus set forth in claim 60 wherein said semi-cylindrical surface portion has edges flaring outwardly.

62. The apparatus set forth in claim 61 including a blow off nozzle positioned within each said transfer nest.

63. The apparatus set forth in claim 62 wherein each said blow off nozzle includes an upper portion and means for adjusting the position of each said nozzle axially of said cylindrical surface.

64. The apparatus set forth in claim 63 wherein each said nozzle includes a lower portion of greater diameter than the upper portion.

65. The apparatus set forth in claim 64 wherein the diameter of said lower portion of each said blow off nozzle has a diameter of the semi-cylindrical surface of the lower portion of the transfer nest.

66. The apparatus set forth in claim 65 wherein said lower portion of the blow off nozzle is hollow defining a plenum and axial openings extending from said plenum in said lower portion of said nozzle to the interior of said transfer nest and an axial opening in said upper portion of said blow off nozzle communicating with said plenum in the lower portion such that fluid can be supplied through the axial opening in the upper portion to the plenum in the lower portion.

67. The apparatus set forth in claim 66 including means for supplying fluid to each said blow-off nozzle as it moves past a discharge station.

68. The apparatus set forth in claim 67 including means for moving said supply means circumferentially relative to said disk to adjust the position of application of fluid to each said blow-off nozzle.

69. The apparatus set forth in any one of claims 52–68 wherein the axis of rotation of said disk is vertical, the extrusion nozzle means is positioned to extrude extrudate upwardly and the axis of each nest is vertical.

70. The apparatus set forth in any one of claims 52–68 wherein the axis of rotation of said disk is horizontal, the extrusion nozzle means is positioned to extrude extrudate downwardly and the axis of each nest is parallel to the plane of the disk.

71. The apparatus set forth in any one of claims 52–68 wherein the axis of rotation of the disk is at 45° degrees to the vertical, the extruder nozzle means is positioned to extrude extrudate horizontally and the axis of each nest is at an angle of 45° to the plane of the disk.

* * * * *